(12) United States Patent
Hess

(10) Patent No.: US 11,081,284 B2
(45) Date of Patent: Aug. 3, 2021

(54) SENSOR RECORDING TEMPERATURE AND PRESSURE

(71) Applicant: Huba Control AG, Würenlos (CH)

(72) Inventor: Juerg Hess, Haegglingen (CH)

(73) Assignee: HUBA CONTROL AG, Würenlos (CH)

( * ) Notice: Subject to any disclaimer, the term of this patent is extended or adjusted under 35 U.S.C. 154(b) by 268 days.

(21) Appl. No.: 16/410,064

(22) Filed: May 13, 2019

(65) Prior Publication Data

US 2019/0348223 A1 Nov. 14, 2019

(30) Foreign Application Priority Data

May 14, 2018 (EP) ..................................... 18172161
Nov. 22, 2018 (EP) ..................................... 18207827

(51) Int. Cl.
*G01L 9/12* (2006.01)
*G01L 9/00* (2006.01)
*H01G 5/18* (2006.01)

(52) U.S. Cl.
CPC ............. *H01G 5/18* (2013.01); *G01L 9/0075* (2013.01); *G01L 9/12* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627;
(Continued)

(56) References Cited

U.S. PATENT DOCUMENTS

| 2012/0174681 A1* | 7/2012 | Drewes | G01L 9/0075 73/724 |
| 2014/0153613 A1 | 6/2014 | Wienand et al. | 374/185 |

(Continued)

FOREIGN PATENT DOCUMENTS

| DE | 40 11 901 A1 | 10/1991 | G01L 19/00 |
| DE | 19601077 A1 | 7/1997 | G01L 5/28 |

(Continued)

*Primary Examiner* — Andre J Allen
(74) *Attorney, Agent, or Firm* — Slayden Grubert Beard PLLC

(57) ABSTRACT

Various embodiments include a capacitive pressure transducer for measuring the pressure of a medium adjacent to the transducer comprising: a measurement diaphragm including a first surface in contact with the medium and a second surface facing away from the medium; a measurement electrode integrated with the measurement diaphragm; a base body arranged opposite the second surface, the base body comprising a counter electrode forming a measurement capacitance with the measurement electrode; and an electrically insulating chamber bounded by the base body and the measurement diaphragm. The counter electrode is in contact with the electrically insulating chamber. At least one of the measurement electrode or the counter electrode comprises a meandering pattern layer in direct contact with the electrically insulating chamber.

15 Claims, 5 Drawing Sheets

(58) Field of Classification Search
CPC ..... G01L 19/0681; G01L 27/002; G01L 9/00;
G01L 9/0041; G01L 9/0044; G01L
11/025; G01L 11/04; G01L 19/0023;
G01L 19/0672; G01L 19/069; G01L
19/142; G01L 19/145; G01L 19/16; G01L
7/00; G01L 9/0047; G01L 9/06; G01L
9/065; G01L 9/12; G01L 11/02; G01L
13/00; G01L 15/00; G01L 19/0015; G01L
19/003; G01L 19/02; G01L 19/0609;
G01L 19/083; G01L 19/10; G01L 19/148;
G01L 27/005; G01L 7/08; G01L 7/082;
G01L 7/163; G01L 7/166; G01L 9/0045;
G01L 9/0048; G01L 9/006; G01L 9/007;
G01L 9/0076; G01L 9/04; G01L 9/045;
G01L 9/125; G01L 11/00; G01L 17/00;
G01L 19/00; G01L 19/0076; G01L 19/08;
G01L 19/141; G01L 19/146; G01L 1/142;
G01L 1/2262; G01L 1/246; G01L 21/12;
G01L 23/16; G01L 27/007; G01L 7/04;
G01L 7/063; G01L 7/084; G01L 7/086;
G01L 7/16; G01L 9/0002; G01L 9/0007;
G01L 9/0016; G01L 9/0019; G01L
9/0022; G01L 9/0027; G01L 9/0033;
G01L 9/0039; G01L 9/005; G01L 9/0058;
G01L 9/0077; G01L 9/0079; G01L 9/008;
G01L 9/0092; G01L 9/0095; G01L 9/025;
G01L 9/08; G01L 9/085; G01L 9/105;
G01L 9/14; G01L 9/16; H01L
2224/48091; H01L 2924/00014; H01L
2224/48137; H01L 2224/48145; H01L
2224/73265; H01L 2924/00012; H01L
2224/04105; H01L 2224/24137; H01L
2224/49175; H01L 24/19; H01L
2924/1461; H01L 2924/1815; H01L
2924/18162; H01L 29/84; H01L 41/047;
H01L 41/0475; H01L 41/1132
USPC .................................................. 73/700–756
See application file for complete search history.

(56) References Cited

U.S. PATENT DOCUMENTS

| | | | |
|---|---|---|---|
| 2016/0025582 A1* | 1/2016 | Fehrenbach | G01L 9/0075 73/724 |
| 2016/0305839 A1* | 10/2016 | Becher | G01L 19/142 |
| 2017/0349430 A1* | 12/2017 | Sato | G01L 9/0045 |
| 2018/0364125 A1* | 12/2018 | Rossberg | G01L 19/0092 |

FOREIGN PATENT DOCUMENTS

| | | | | |
|---|---|---|---|---|
| DE | 10 2011 051 845 B3 | 10/2012 | | G01K 7/18 |
| EP | 1 174 696 A2 | 1/2002 | | G01L 19/00 |
| EP | 2 784 462 A1 | 10/2014 | | G01L 19/00 |
| JP | 2012-073141 A | 4/2012 | | G01L 19/04 |

* cited by examiner

SENSOR RECORDING TEMPERATURE AND PRESSURE

CROSS-REFERENCE TO RELATED APPLICATIONS

This application claims priority to EP Application No. 18207827.9 filed Nov. 22, 2018 and EP Application No. 18172161.4 filed May 14, 2018, the contents of which are hereby incorporated by reference in their entirety.

TECHNICAL FIELD

The present disclosure relates to a sensor recording pressure as well as temperature. Some embodiments include sensors having a capacitive pressure transducer combined with a resistive temperature sensor.

BACKGROUND

Differential pressure may be measured using capacitive sensors. A capacitive sensor generally comprises a first electrode and a second electrode. The second electrode is arranged at a distance from the first electrode. The second electrode then serves as a counter electrode to the first electrode. The distance between these electrodes changes with the pressure applied to any of the electrodes. Accordingly, the electric capacitance of the arrangement depends on pressure. An estimate of differential pressure can thus be derived from the capacitance of the arrangement. Measurements of differential pressure are also influenced by temperature. Electrodes as well as any spacer elements generally exhibit dilations in response to changes in temperature. Also, the flexural modulus of any elastic component generally depends on temperature.

The German patent application DE4011901A1 describes a capacitive pressure sensor. The sensor of DE4011901A1 comprises a substrate 1 and a disc 3. A first electrode 7 is carried by the substrate 1. A second electrode 5 is carried by the disc 3. The second electrode 5 thus forms a measurement capacitance together with the first electrode 7. An increase in pressure applied to the disc 3 will shift the second electrode 5 toward the first electrode 7 thereby increasing the capacitance of the arrangement. DE4011901A1 also discloses an annular resistive member 6. The annular resistive member 6 surrounds the first electrode 7. An electric current can be applied to the resistive member 6 via two contacts 9. An indication of temperature can be derived from a voltage drop between the contacts 9.

The European patent application EP1174696A2 describes a pressure transducer including a temperature sensor. The pressure transducer of EP1174696A2 comprises a substrate 1 and a diaphragm 2. A first electrode 6 sits on the substrate 1. A second electrode 8 sits on the diaphragm 2. A layer 4 made from glass separates the substrate 1 and the first electrode 6 from the diaphragm 8 and from the second electrode 8. EP1174696A2 also describes a temperature probe 5. The temperature probe 5 is a resistive element that meanders between contacts 9. The meandering temperature probe 5 is embedded in the separating glass layer 4 and surrounds the first electrode 6.

The European patent application EP2784462A1 describes a capacitive pressure measurement cell for detecting the pressure of a medium adjacent to the measurement cell. EP2784462A1 discloses a cell with a diaphragm 2. A resistive layer 4 sits on the diaphragm 2.

The resistive layer 4 carries a measurement electrode 7 such that the resistive layer 4 is interposed between the diaphragm 2 and the electrode 7. The resistive layer 4 is thus not in contact, in particular not in direct contact, with the insulation chamber in between the electrodes 7, 8. The resistive layer 4 comprises a single wire following a serrated pattern between a first contact 4a and a second contact 4b of the resistive layer 4. The first contact 4a and the second contact 4b are disposed at opposite ends of the resistive layer 4.

SUMMARY

The present disclosure describes differential pressure transducers with built-in temperature sensors and sensor arrangements operable to measure both temperature and pressure at similar locations. For example, some embodiments include a capacitive pressure transducer (1) for measuring the pressure of a medium adjacent to the transducer (1), the capacitive pressure transducer (1) comprising: a measurement diaphragm (2) having a first surface (2a) and a second surface (2b), wherein the first surface (2a) is in contact with the medium, and wherein the second surface (2b) faces away from the medium; the measurement diaphragm (2) further comprising a measurement electrode (7); the capacitive pressure transducer (1) also comprising a base body (3) arranged opposite the second surface (2b) of the measurement diaphragm (2), the base body (3) comprising a counter electrode (8), the counter electrode (8) and the measurement electrode (7) forming a measurement capacitance; the capacitive pressure transducer (1) also comprising an electrically insulating chamber (9) defined by the base body (3) and by the measurement diaphragm (2); wherein the counter electrode (8) is in contact with the electrically insulating chamber (9); wherein at least one of the measurement electrode (7) or of the counter electrode (8) comprises a meandering pattern layer (4); and wherein the meandering pattern layer (4) is in direct contact with the electrically insulating chamber (9).

In some embodiments, the meandering pattern layer (4) is made from of a material having a temperature dependent resistance.

In some embodiments, the meandering pattern layer (4) comprises a film (6) made from a material having a temperature dependent resistance.

In some embodiments, the film (6) comprises a plurality of substantially parallel grooves (5).

In some embodiments, the measurement electrode (7) is in contact with the electrically insulating chamber (9).

In some embodiments, the electrically insulating chamber (9) is filled with a gaseous fluid selected from: air, or carbon dioxide, or helium, or nitrogen, or sulfur hexafluoride.

In some embodiments, the electrically insulating chamber (9) is interposed between the measurement electrode (7) and the counter electrode (8).

In some embodiments, at least one of the measurement electrode (7) or of the counter electrode (8) consists of a meandering pattern layer (4).

In some embodiments, the measurement diaphragm (2) separates the electrically insulating chamber (9) from the medium.

In some embodiments, the meandering pattern layer (4) comprises a first conductor (12a) with a plurality of segments and a second conductor (12b) with a plurality of segments; and wherein the segments of the first conductor (12a) mesh with the segments of the second conductor (12b).

In some embodiments, the film (6) comprises electrically conductive segments and electrically insulating segments (5); and wherein the electrically conductive segments and the electrically insulating segments (5) are arranged in a pattern with alternating electrically conductive and electrically insulating segments. In some embodiments, the meandering pattern layer (4) comprises a first electric connection member (11a) and a second electric connection member (11b).

In some embodiments, the film (6) is made from an electrically conductive material; and wherein the first electric connection member (11a) and the second electric connection member (11b) electrically connect to the film (6) such that an electric current may flow from the first electric connection member (11a) through the film (6) to the second electric connection member (11b).

In some embodiments, the electric resistivity between the first electric connection member (11a) and the second electric connection member (11b) at 293 Kelvin, at 9 Volts and under the application of direct current lies between 5.0 Ohm and 10 kOhm.

In some embodiments, the meandering pattern layer (4) comprises a pair of conductors, the pair of conductors being arranged as a bifilar meander.

BRIEF DESCRIPTION OF THE DRAWINGS

Various features will become apparent to those skilled in the art from the following detailed description of the disclosed non-limiting embodiments. The drawing that accompanies the detailed description can be briefly described as follows.

DETAILED DESCRIPTION

Figure 1:
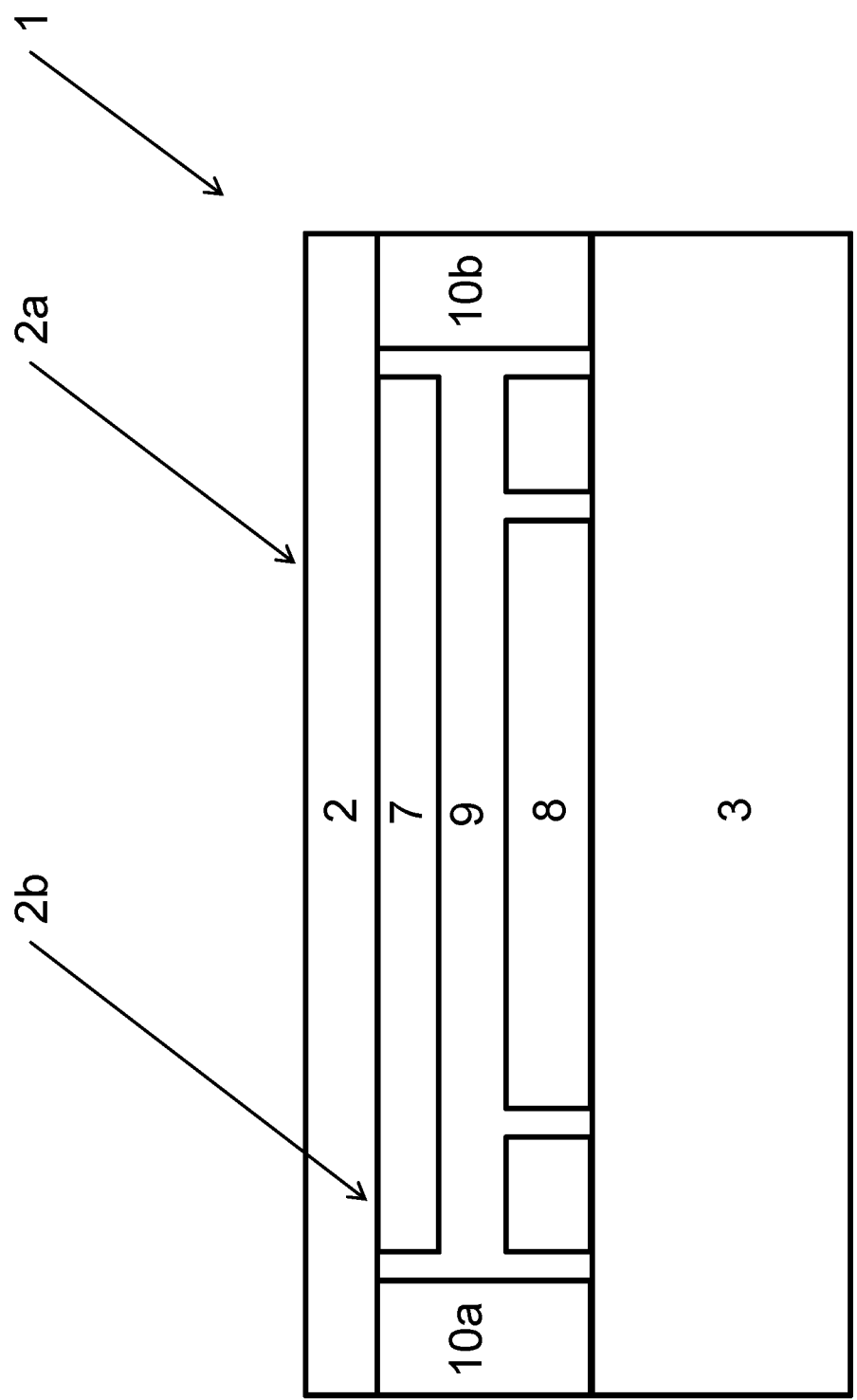
FIG. 1 is a cross-section view of a capacitive pressure transducer incorporating teachings of the instant disclosure.

Various embodiments of the present disclosure include a transducer with a dual-purpose sensor element that responds to changes in pressure. The sensor element also changes resistivity in response to changes in temperature. In some embodiments, the sensor element comprises a diaphragm and is displaced as a function of, in particular as a direct function of, pressure applied on either side of the diaphragm. The diaphragm is also coated with a thin electrically conductive layer. A displacement of the diaphragm yields a displacement of the conductive layer. The capacitance between the conductive layer and a counter electrode thus changes. The arrangement enables determination of pressures on the basis of the capacitance between the conductive layer and its counter electrode.

In some embodiments, the conductive layer is made from a material with temperature dependent resistivity and is also structured. The structure of the conductive layer extends the length of an electric path from one end of the conductive layer to another end of the conductive layer. An electric current flowing through the conductive layer thus meanders in accordance with the structure of the layer. The responsiveness of the arrangement to changes in temperature increases with the length of the current path. That is, the meandering structure enables detection of relatively small changes in temperature.

Some embodiments include a capacitive pressure transducer for measuring the pressure of a medium adjacent to the transducer, the capacitive pressure transducer comprising: a measurement diaphragm having a first surface and a second surface, wherein the first surface is in contact with the medium, and wherein the second surface faces away from the medium; the measurement diaphragm further comprising a measurement electrode; the capacitive pressure transducer also comprising a base body arranged opposite the second surface of the measurement diaphragm, the base body comprising a counter electrode, the counter electrode and the measurement electrode forming a measurement capacitance; the capacitive pressure transducer also comprising an electrically insulating chamber defined by the base body and the measurement diaphragm; wherein the counter electrode is in contact with the electrically insulating chamber; wherein at least one of the measurement electrode or of the counter electrode comprises a meandering pattern layer; and wherein the meandering pattern layer is in contact with the electrically insulating chamber.

In some embodiments, the design maximizes the length of the path of an electric current through the resistive layer. To that end, the meandering pattern layer comprises a plurality of parallel or of substantially parallel grooves. Since the grooves are electrically insulating, an electric current has to meander around these grooves. In some embodiments, the meandering pattern layer comprises a pair of conductors meshing one another. In some embodiments, each of the conductors exhibits a serrated profile. In some embodiments, the meandering pattern layer comprises a pair of conductors arranged as a bifilar meander. The pair of conductors may be arranged as a pair of parallel bifilar conductors.

In some embodiments, the design maximizes the length of the path of an electric current through the resistive layer. To that end, the resistive layer covers the entire measurement electrode or covers the entire counter electrode. In other words, the measurement electrode or the counter electrode consists of a meandering pattern layer.

The teachings of the instant disclosure describe a relatively compact capacitive pressure transducer. In some embodiments, the meandering pattern layer and also the measurement electrode are in contact with the electrically insulating chamber. Some embodiments include a relatively compact capacitive pressure transducer. In some embodiments, the electrically insulating chamber is interposed between the measurement electrode and the counter electrode.

Some embodiments include a capacitive pressure transducer with high sensitivity. In some embodiments, the capacitive pressure transducer is filled with a compressible fluid. The fluid is may be gaseous. The fluid may, by way of non-limiting example, be selected from:
 air, or
 carbon dioxide, or
 helium, or
 nitrogen, or
 sulfur hexafluoride, or
 a blended form thereof.

In some embodiments, the gaseous fluid consists of or comprises a noble and/or an inert gas.

Some embodiments include a capacitive pressure transducer with yet better sensitivity. In some embodiments, the measurement diaphragm separates, completely separates, or even isolates, the electrically insulating chamber from the medium.

Some embodiments include a pressure transmitter that comprises a capacitive pressure transducer in accordance with the instant disclosure. The present disclosure further describes a circuit for heating, cooling, air-conditioning and/or ventilation that comprises a capacitive pressure transducer and/or a pressure transmitter in accordance with the instant disclosure.

The present disclosure still further provides a circuit for heating, cooling, air-conditioning and/or ventilation that comprises a capacitive pressure transducer and/or a pressure transmitter in accordance with the instant disclosure, wherein the circuit is a variable air volume system.

In some embodiments, the capacitive pressure transducer of the instant disclosure may form the sensor member of a pressure transmitter. Circuits for heating, ventilation and/or air-conditioning may employ such capacitive pressure transducers and/or such pressure transmitters.

FIG. 1 shows a capacitive pressure transducer 1 comprising a base body 3 and a measurement diaphragm 2. Measurement diaphragm 2 may comprise a membrane. Different pressures applied on the first side 2a and on the second side 2b of the measurement diaphragm 2 mechanically deflect the diaphragm 2. The measurement diaphragm 2 accordingly responds to changes in pressure by bulging toward or away from the base body 3. In some embodiments, the measurement diaphragm 2 is a resilient measurement diaphragm.

Measurement diaphragm 2 can, by way of non-limiting example, be made from aluminum oxide ceramics ($Al_2O_3$). In some embodiments, measurement diaphragm 2 is made from aluminum oxide ceramics with more than 92% purity. In some embodiments, measurement diaphragm 2 is made from aluminum oxide with 96% purity. In some embodiments, aluminum oxide is employed that is more than 99% pure. Higher levels of purity offer benefits in terms of mechanical tightness, mechanical brittleness, and dielectric strength. In some embodiments, measurement diaphragm 2 comprises glass.

In some embodiments, spacers 10a, 10b separate the measurement diaphragm 2 from the base body 3. The spacers 10a, 10b, may, by way of non-limiting example, be formed by an O-ring or by a gasket or by an annular portion. In some embodiments, the spacers 10a, 10b form an integral portion of base body 3. In some embodiments, base body 3 is a substrate.

In some embodiments, manufacture of the base body 3 and/or of the spacers 10a, 10b involves (injection) moulding. In some embodiments, manufacture of the base body 3 and/or of the spacers 10a, 10b involves additive manufacturing such as three-dimensional printing.

In some embodiments, base body 3 and/or spacers 10a, 10b are made from a ceramic material such as aluminum oxide ($Al_2O_3$) and/or silicon carbide (SiC) and/or of zirconium dioxide ($ZrO_2$) and/or of magnesium oxide (MgO). Base body 3 and/or spacers 10a, 10b can, by way of non-limiting example, be made from aluminum oxide ceramics ($Al_2O_3$). In some embodiments, base body 3 and/or spacers 10a, 10b are all made from aluminum oxide ceramics with more than 92% purity. In some embodiments, they are made from aluminum oxide with 96% purity. In some embodiments, aluminum oxide is employed that is more than 99% pure. Higher levels of purity offer benefits in terms of mechanical tightness, mechanical brittleness, and dielectric strength. In some embodiments, base body 3 and/or spacers 10a, 10b are made from glass material.

In some embodiments, the base body 3 and/or the spacers 10a, 10b exhibit a volume resistivity at 293 Kelvin, at 9 Volts and under the application of direct current, of at least $10^{13}$ Ohm·m. In some embodiments, the base body 3 and/or the spacers 10a, 10b exhibit a volume resistivity at 293 Kelvin, at 9 Volts and under the application of direct current, of at least $10^{14}$ Ohm·m. In some embodiments, the base body 3 and/or the spacers 10a, 10b exhibit a volume resistivity at 293 Kelvin, at 9 Volts and under the application of direct current, of at least $10^{16}$ Ohm·m.

In some embodiments, the base body 3 and the spacers 10a, 10b form a single piece. That is, the spacers 10a, 10b are in integral portion of the base body 3. Diaphragm 2 as shown on FIG. 1 is mounted to spacers 10a, 10b. The spacers 10a, 10b together with base body 3 and with diaphragm 2 define a chamber 9. That is, the chamber 9 is enclosed by the base body 3 and by the diaphragm 2.

The chamber 9 may be isolated from any medium such as air surrounding pressure transducer 1. The chamber 9 may be isolated from any medium such as air that is in contact with side 2a of measurement diaphragm 2. To that end, the spacers 10a, 10b are arranged to inhibit leakages to and from chamber 9.

In some embodiments, a measurement electrode 7 is affixed to measurement diaphragm 2. The measurement electrode 7 may comprise a conductive material. The measurement electrode 7 may, by way of non-limiting example, be made from:
copper, or of
aluminum, or of
platinum, or of
gold, or of
an alloy thereof.

In some embodiments, the measurement electrode 7 exhibits a volume resistivity at 293 Kelvin, at 9 Volts and under the application of direct current, of less than $10^{-5}$ Ohm·m. In some embodiments, the measurement electrode 7 exhibits a volume resistivity at 293 Kelvin, at 9 Volts and under the application of direct current, of less than $10^{-6}$ Ohm·m. In some embodiments, the measurement electrode 7 exhibits a volume resistivity at 293 Kelvin, at 9 Volts and under the application of direct current, of less than $10^{-7}$ Ohm·m.

The measurement diaphragm 2 may be on at least one side 2b coated with a film 6 (shown in FIG. 2) forming the measurement electrode 7. The film 6 may be less than 20 µm thick, less than 5 µm thick, and/or between 1 µm and 3 µm thick. Thin films 6 yield advantages in terms of large resistivity and improved measuring sensitivity of the arrangement.

A counter electrode 8 is affixed to base body 3. The counter electrode 8 may comprise a conductive material. The counter electrode 8 may, by way of non-limiting example, be made from:
copper, or of
aluminum, or of
platinum, or of
gold, or of
an alloy thereof.

In some embodiments, the counter electrode 8 exhibits a volume resistivity at 293 Kelvin, at 9 Volts and under the application of direct current, of less than $10^{-5}$ Ohm·m. In some embodiments, the counter electrode 8 exhibits a volume resistivity at 293 Kelvin, at 9 Volts and under the application of direct current, of less than $10^{-6}$ Ohm·m. In some embodiments, the counter electrode 8 exhibits a volume resistivity at 293 Kelvin, at 9 Volts and under the application of direct current, of less than $10^{-7}$ Ohm·m.

The base body 3 may be at least partially coated with a film forming the counter electrode 8. The film 6 may be less than 20 µm thick, less than 5 µm thick, and/or between 1 µm and 3 µm thick. Thin films 6 yield advantages in terms of large resistivity and improved measuring sensitivity of the arrangement.

The measurement electrode 7 and the counter electrode 8 together form a measurement capacitance. The distance between any two points on the surface of the measurement electrode 7 and on the surface of the counter electrode 8 may be between 10 µm and 100 µm, between 15 µm and 70 µm, or between 20 µm and 40 µm. The capacitance value of the arrangement may lie in a range between 1 pF and 100 pF, in a range between 10 pF and 70 pF, and/or in a range between 20 pF and 50 pF.

The chamber 9 provides electrical insulation between the measurement electrode 7 and the counter electrode 8. To that end, the chamber 9 can be filled with a gaseous fluid such as:
air, or
carbon dioxide, or
helium, or
nitrogen, or
sulfur hexafluoride, or
a blended form thereof.

In some embodiments, the chamber 9 is filled with a gaseous fluid having a volume resistivity at 293 Kelvin, at 1013 hPa, at 9 Volts and under the application of direct current, of at least $10^{13}$ Ohm·m. In some embodiments, the chamber 9 is filled with a gaseous fluid having a volume resistivity at 293 Kelvin, at 1013 hPa, at 9 Volts and under the application of direct current, of at least $10^{14}$ Ohm·m. In some embodiments, the chamber 9 is filled with a gaseous fluid having a volume resistivity at 293 Kelvin, at 1013 hPa, at 9 Volts and under the application of direct current, of at least $10^{15}$ Ohm·m.

Figure 2:
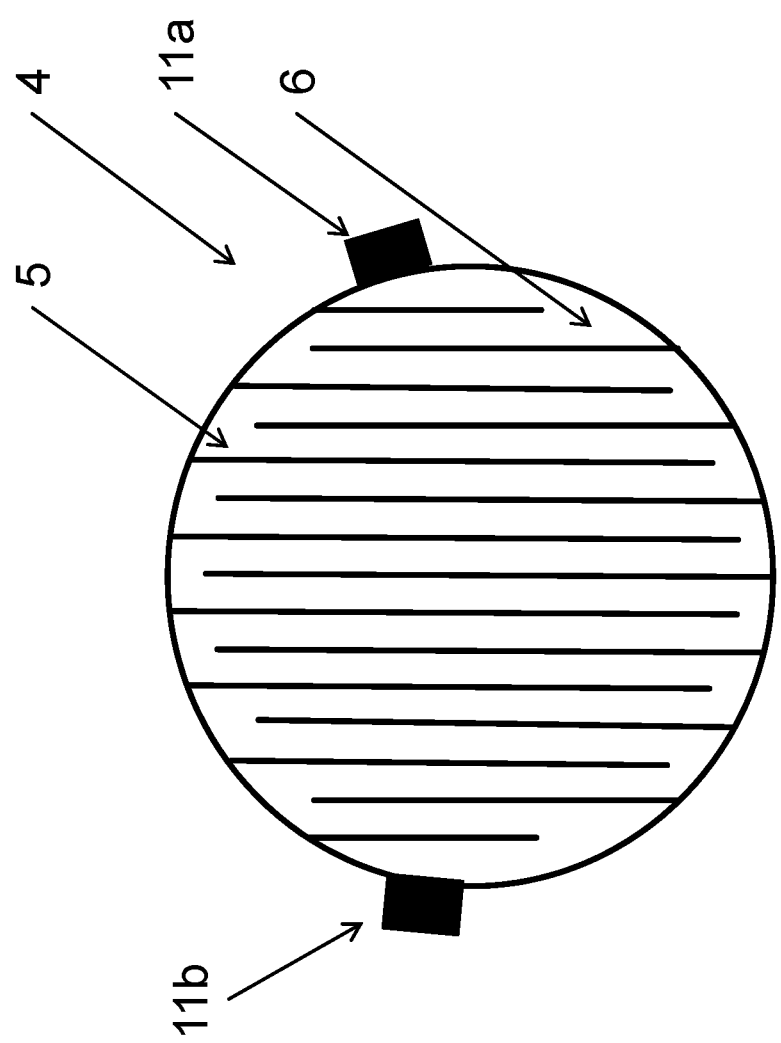
FIG. 2 is a plan view of a meandering pattern layer incorporating teachings of the instant disclosure.

Now turning to FIG. 2, a meandering pattern layer 4 is shown. The meandering pattern layer 4 as shown on FIG. 2 is disc-shaped. The meandering pattern layer 4 may as well be quadratic, rectangular, triangular, or hexagonal. The above list is not exhaustive. The meandering pattern layer 4 is arranged on a surface to have a first end portion and a second end portion. The second end portion is arranged opposite the first end portion. The meandering pattern layer 4 also has a diameter dimension between the first end portion and the second end portion. In some embodiments, the diameter dimension is between 1.5 mm and 20 mm long, between 2 mm and 10 mm long, or between 4 mm and 5 mm long. Small diameters of the meandering pattern layer 4 enable miniaturized devices. At the same time, the diameter dimensions need to be large enough to ensure sufficient capacitance and/or resistivity.

The meandering pattern layer 4 comprises a first 11a and a second 11b electric connection member. In some embodiments, at least one of the two electric connection members 11a, 11b is a bonding wire. In some embodiments, the two electric connection members 11a, 11b are bonding wires. In some embodiments, at least one of the two electric connection members 11a, 11b is a prong. In some embodiments, the two electric connection members 11a, 11b are prongs.

The two electric connection members 11a and 11b electrically connect to the surface of the meandering pattern layer 4. In some embodiments, an electric current may flow from the first electric connection member 11a through the surface of the meandering pattern layer 4 to the second electric connection member 11b. The electric resistivity at any junction between electric connection members 11a and 11b and the surface of meandering pattern layer 4 may be less than 1 Ohm, less than 100 mOhm, and/or less than 10 mOhm. Low values of electric resistivity of the junction improve on signal-to-noise ratio.

The resistivity from the first electric connection member 11a through the meandering pattern layer 4 to the second electric connection member 11b generally varies based on temperature, voltage applied across the members 11a and 11b and the application of direct current. Typical values of resistivity at 293 Kelvin, at 9 Volts and under the application of direct current, lie between 1 Ohm and 100 kOhm. In some embodiments, values of resistivity at 293 Kelvin, at 9 Volts and under the application of direct current, lie between 5.0 Ohm and 10 kOhm. In some embodiments, values of resistivity at 293 Kelvin, at 9 Volts and under the application of direct current, lie between 10 Ohm and 1 kOhm.

The meandering pattern layer 4 may comprise a film 6. The film 6 may be electrically conductive. The film 6 may, by way of non-limiting example, be made from:
copper, or of
aluminum, or of
platinum, or of
gold, or of
an alloy thereof.

In some embodiments, the film 6 exhibits a volume resistivity at 293 Kelvin, at 9 Volts and under the application of direct current, of less than $10^{-5}$ Ohm·m. In some embodiments, the film 6 exhibits a volume resistivity at 293 Kelvin, at 9 Volts and under the application of direct current, of less than $10^{-6}$ Ohm·m. In some embodiments, the film 6 exhibits a volume resistivity at 293 Kelvin, at 9 Volts and under the application of direct current, of less than $10^{-7}$ Ohm·m.

The film 6 may be less than 20 µm thick, less than 5 µm thick, and/or between 1 µm and 3 µm thick. Thin films 6 yield advantages in terms of large resistivity and improved sensitivity of the arrangement.

In some embodiments, the aforementioned electric connection members 11a and 11b may make direct electric contact with the film 6. A plurality of substantially parallel grooves 5 is arranged on the surface of the meandering pattern layer 4. They increase the length of a current path between the electric connection members 11a and 11b. It is envisaged that the grooves 5 are trenches. The grooves 5 are electrically insulating. They may exhibit a surface resistivity of at least 100 kOhm, at least 1 MOhm, and/or at least 10 MOhm.

In some embodiments, the meandering pattern layer 4 comprises at least two grooves 5. Meandering pattern layer 4 may comprise at least four grooves 5. Meandering pattern layer 4 may comprise at least eight grooves 5. The grooves 5 may be arranged as parallel or as substantially parallel grooves.

In some embodiments, the grooves 5 are arranged so as to produce a film 6 with a fractal structure. In other words, the surface of meandering pattern layer 4 exhibits a self-similar profile. A fractal structure of film 6 enables an even longer current path between electric contact members 11a and 11b.

In some embodiments, the grooves 5 are formed on the film 6 by Ar+ ion etching. In some embodiments, the film 6 and the grooves 5 are formed using optical lithography. In some embodiments, manufacture of the film 6 and the grooves 6 involves thick-film technology, in particular thick-film technology combined with screen printing. In some embodiments, the film 6 is made from a semiconducting material such as Si or Ge or GaAs or ZnO or GaN. This list is not exhaustive. A meandering structure of film 6 may then be accomplished by arranging or depositing alternating sections made from differently doped semiconducting material. Insulating sections 5 and electrically conductive sections 6 may thus be created by varying dopant concentrations.

Figure 3:
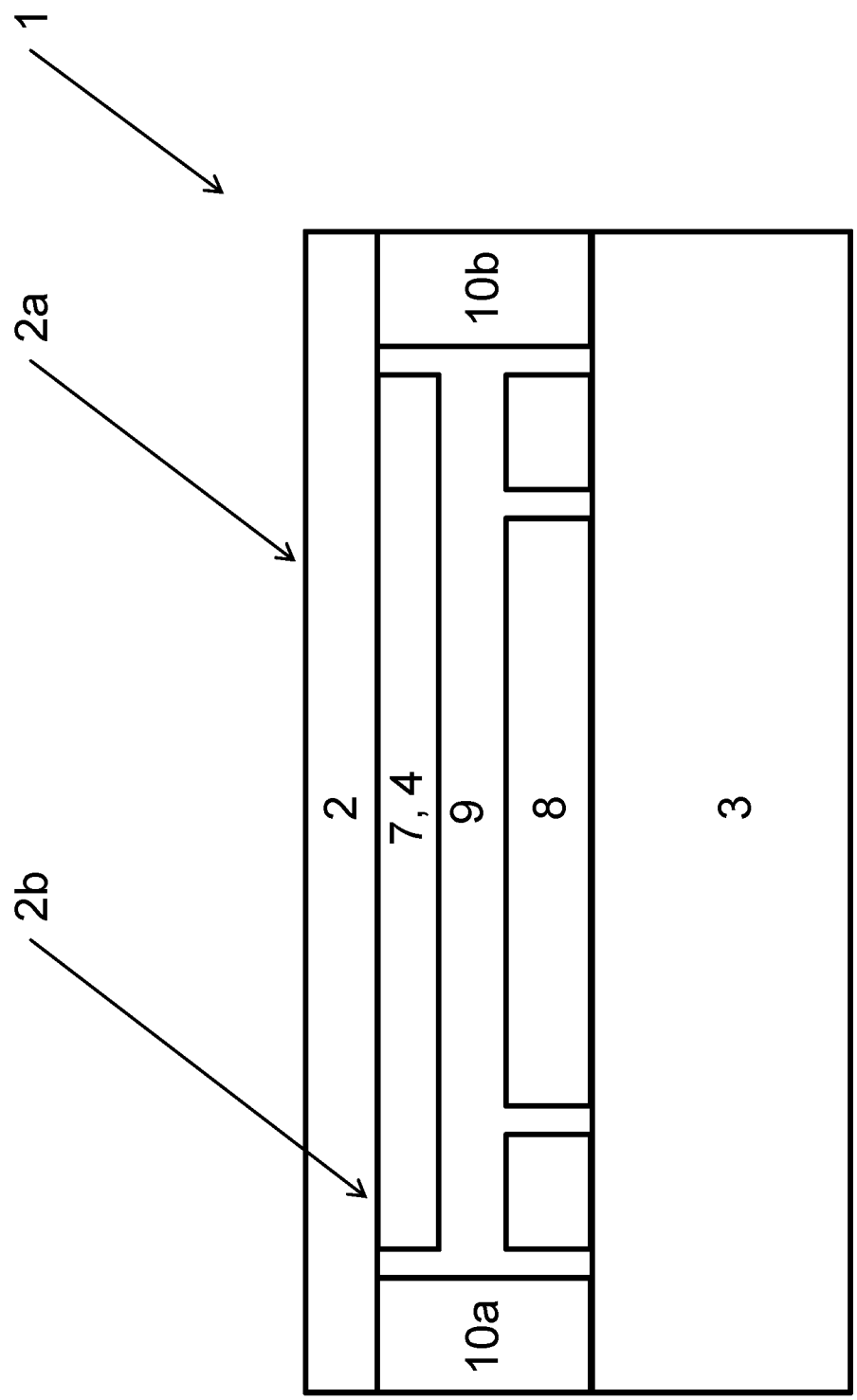
FIG. 3 is a cross-section view of a capacitive pressure transducer wherein the meandering pattern layer is part of the measurement electrode incorporating teachings of the instant disclosure.

Now referring to FIG. 3, a capacitive pressure transducer 1 is shown wherein the measurement electrode 7 comprises the meandering pattern layer 4. In some embodiments, measurement electrode 7 is or consists of meandering pattern layer 4. The measurement electrode 7 and the meandering pattern layer 4 may thus form a single piece. The meandering pattern layer 4 of the measurement electrode 7 forms a measurement capacitance together with the counter electrode 8. The capacitance value of this arrangement may lie in a range between 1 pF and 100 pF, between 10 pF and 70 pF, and/or between 20 pF and 50 pF.

Integration of meandering pattern layer 4 into measurement capacitance 7 depends on conflicting technical requirements. On the one hand, a large resistivity of an electric current path through meandering pattern layer 4 may yield an excessive resistive, capacitive R·C time constant. That resistivity then impairs a precise determination of the capacitance of the arrangement. On the other hand, the resistivity of the current path must not be too low. The arrangement may otherwise no longer be sufficiently responsive to changes in temperature.

In some embodiments, meandering pattern layer 4 is a film 6. Measurement diaphragm 2 is coated with this film 6. The skilled person selects materials for the measurement diaphragm 2 and for the film 6 that allow the measurement diaphragm 2 to be coated with the film 6. The skilled person selects a suitable measurement diaphragm 2 such that grooves 5 may be formed on the surface of the assembly using a technique such as Ar+ ion etching.

In other words, both the measurement diaphragm 2 and the film 6 are displaced in response to a pressure applied to measurement diaphragm 2. A meandering pattern layer 4 that bulges together with measurement diaphragm 2 requires a sufficiently thin film 6. The arrangement may otherwise become too stiff and may no longer respond to changes in pressure.

In addition to being thin, the film 6 and the diaphragm 2 also need to endure a sufficient number of flexural cycles. In some embodiments, film 6 and the diaphragm 2 are able to mechanically endure at least 100'000 flexural cycles, 1'000'000 flexural cycles, and/or at least 10'000'000 flexural cycles. The longevity of pressure transducer 1 increases as the mechanical endurance of film 6 and of the diaphragm 2 improves. The skilled person chooses a material for measurement diaphragm 2 and also a material for film 6 to ensure sufficient mechanical endurance.

Figure 4:
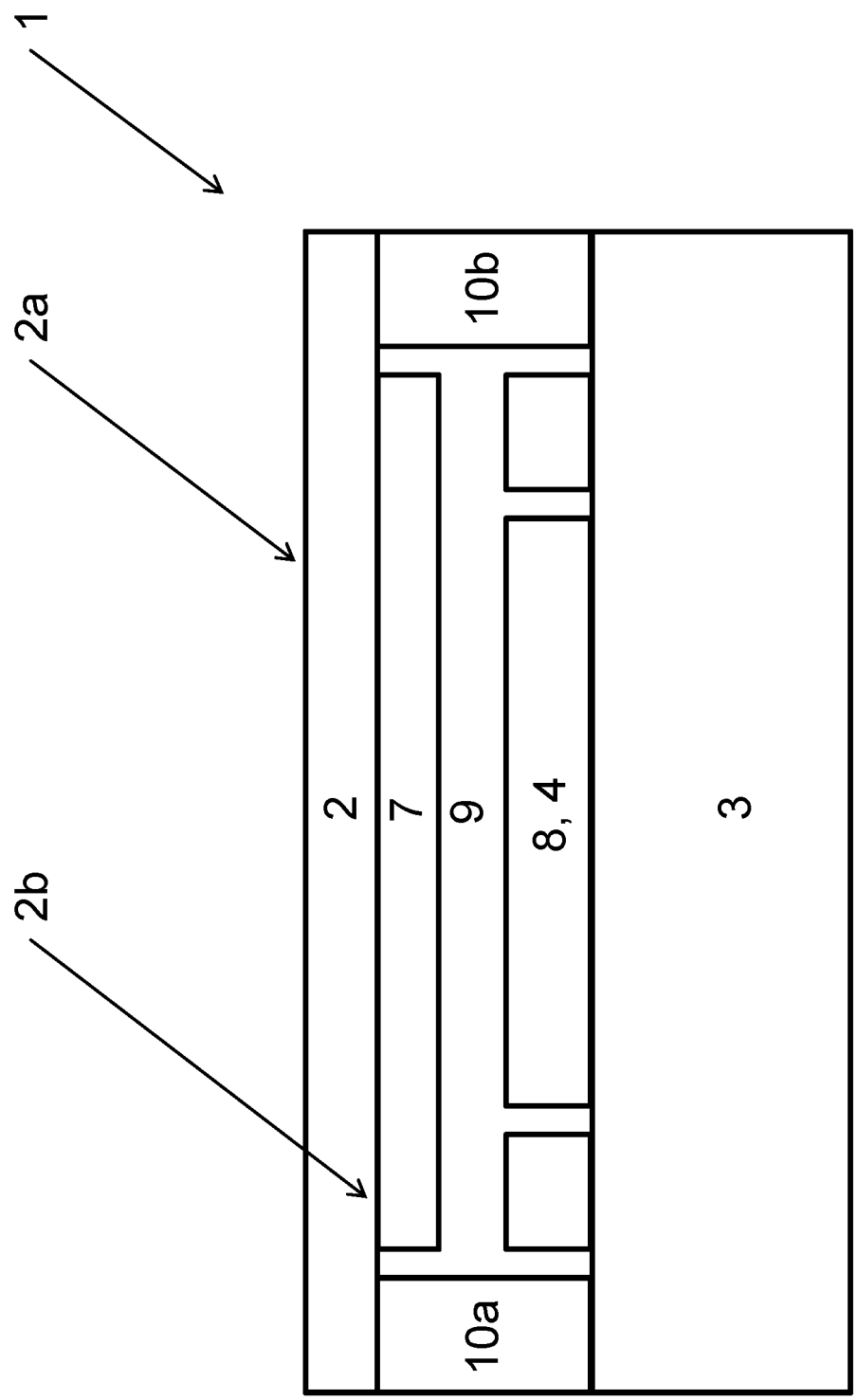
FIG. 4 is a cross-section view of a capacitive pressure transducer wherein the meandering pattern layer is part of the counter electrode incorporating teachings of the instant disclosure.

Now referring to FIG. 4, a capacitive pressure transducer 1 is shown wherein the counter electrode 8 comprises the meandering pattern layer 4. In some embodiments, counter electrode 8 is or consists of meandering pattern layer 4. The counter electrode 8 and the meandering pattern layer 4 thus form a single piece. The meandering pattern layer 4 of the counter electrode 8 forms a measurement capacitance together with the measurement electrode 7. The capacitance value of this arrangement may lie in a range between 1 pF and 100 pF, between 10 pF and 70 pF, and/or between 20 pF and 50 pF.

Integration of meandering pattern layer 4 into measurement capacitance 7 depends on conflicting technical requirements. On the one hand, a large resistivity of an electric current path through meandering pattern layer 4 may yield an excessive resistive, capacitive R·C time constant. That resistivity then impairs a precise determination of the capacitance of the arrangement. On the other hand, the resistivity of the current path must not be too low. The arrangement may otherwise no longer be sufficiently responsive to changes in temperature.

In some embodiments, meandering pattern layer 4 is a film 6. In some embodiments, portion on the surface of base body 3 is coated with this film 6. The skilled person selects materials for the base body 3 and for the film 6 that allow the base body 3 to be coated with the film 6. The skilled person selects a suitable base body 3 such that grooves 5 may be formed on the surface of the assembly using a technique such as Ar+ ion etching.

Figure 5:
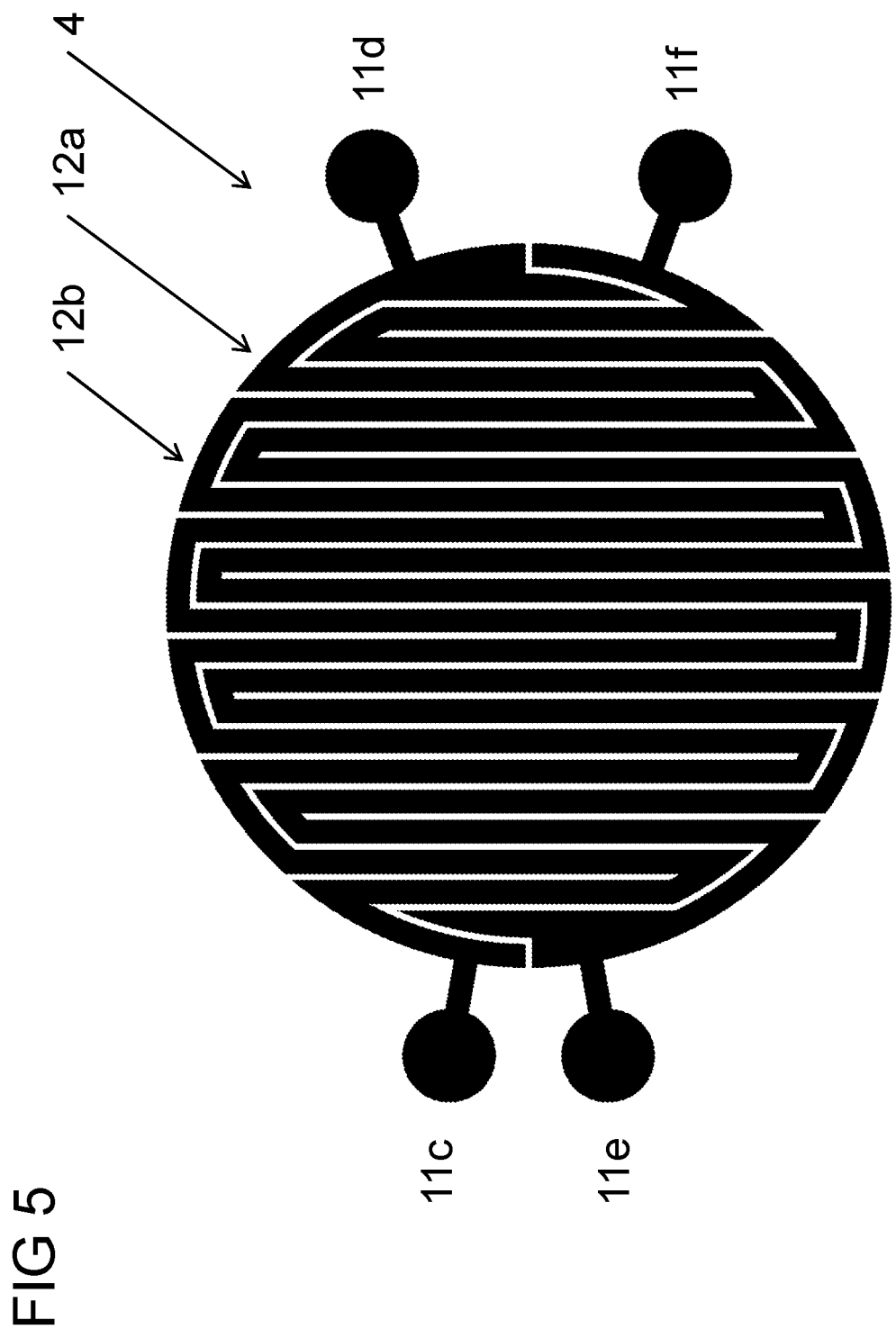
FIG. 5 is a plan view of an alternate meandering pattern layer incorporating teachings of the instant disclosure.

Now turning to FIG. 5, an alternate meandering pattern layer 4 is shown. The meandering pattern layer 4 of FIG. 5 comprises a first meandering conductor 12a and a second meandering conductor 12b. The meandering conductors 12a, 12b exhibit a (serrated) profile made up of a plurality of (substantially) U-shaped arcs. The U-shaped segments interconnect at their ends to form a serrated profile. The first meandering conductor 12a and the second meandering conductor 12b mesh with one another. In some embodiments, a segment of the first meandering conductor 12a is aligned in parallel with at least one neighbouring segment of the second meandering conductor 12b and vice versa.

The meandering conductors 12a, 12b each have a pair of electric connection members 11c-11f. The meandering pattern layer shown on FIG. 5 thus provides a total of four electric connection members 11c-11f. The two meandering conductors 12a, 12b are electrically isolated from one another when their respective connection members 11c, 11d; 11e, 11f do not connect. That is, the resistivity between the two meandering conductors 12a, 12b may attain at least 1 MOhm, at least 10 MOhm, and/or at least 100 MOhm. These resistivity values assume a temperature of 293 Kelvin, an applied voltage of 9 Volts and application of direct current. Higher values of resistivity confer advantages in terms of more accurate measurements.

In some embodiments, each pair of electric connection members 11c, 11d; 11e, 11f electrically connects to end portions of its respective meandering conductor 12a, 12b. The arrangement enables currents from a first connection sitting on a first end through the meandering conductor to a second connection sitting on a second end. The electric resistivity at any junction between the electric connection members and the meandering conductor preferably is less than 1 Ohm, yet more preferably less than 100 mOhm, still more preferably less than 10 mOhm. Low values of electric resistivity between electric connection members and the meandering conductor improve on signal-to-noise ratio.

The resistivity of each meandering conductor 12a, 12b generally depends on actual use. Typical values of resistivity at 293 Kelvin, at 9 Volts and under the application of direct current, lie between 1 Ohm and 100 kOhm. In some embodiments, values of resistivity at 293 Kelvin, at 9 Volts and under the application of direct current, lie between 5.0 Ohm and 10 kOhm. In some embodiments, values of resistivity at 293 Kelvin, at 9 Volts and under the application of direct current, lie between 10 Ohm and 1 kOhm. This assumes that values of resistivity are measured between the electric connection members 11c, 11d; 11e, 11f of the meandering conductors 12a, 12b.

In some embodiments, at least one of the two electric connection members 11c-11f of the alternate meandering pattern layer 4 is a bonding wire. In some embodiments, the four electric connection members 11c-11f of the alternate meandering pattern layer 4 are bonding wires. In some embodiments, at least one of the two electric connection members 11c-11f of the alternate meandering pattern layer 4 is a prong. In some embodiments, the four electric connection members 11c-11f of the alternate meandering pattern layer 4 are prongs.

The arrangement as shown on FIG. 5 enables detection of moisture on the surface of the meandering pattern layer 4. Moisture typically short-circuits the first meandering conductor 12a and the second meandering conductor 12b. Consequently, the resistivity between the first meandering conductor 12a and the second meandering conductor 12b drops at least by a factor ten, preferably at least by a factor hundred, yet more preferably at least by a factor thousand. This assumes that the electric connection members 11c, 11d of the first meandering conductor 12a are electrically isolated from the electric connection members 11e, 11f of the second meandering conductor 12b.

In some embodiments, the capacitive pressure transducer 1 of the instant disclosure is used in a fuel cell. In some embodiments, the fluid is gaseous fuel. In some embodiments, the capacitive pressure transducer 1 in a fuel cell generates a signal indicative of pressure of a gaseous fluid such as pressure of gaseous fuel. In some embodiments, the fuel cell is a solid oxide fuel cell. In some embodiments, the fuel cell is a polymer electrolyte fuel cell.

In some embodiments, the first surface 2a is at least partially in contact with the medium. In some embodiments, the first surface 2a faces the medium.

In some embodiments, the first surface 2a and the second surface 2b are arranged on opposite sides of the measurement diaphragm 2. In some embodiments, the first surface 2a is a first side. The second surface 2b is a second side. Also, the first surface 2a and the second surface 2b are arranged on opposite sides of the measurement diaphragm 2.

In some embodiments, the base body 3 is arranged opposite and/or disposed opposite and/or positioned opposite the second surface 2b of the measurement diaphragm 2. That is, the second surface 2b of the measurement diaphragm 2 and the base body 3 arranged on opposite sides of the electrically insulating chamber 9.

In some embodiments, the meandering pattern layer 4 is in direct contact with the electrically insulating chamber 9. In some embodiments, the counter electrode 8 is in direct contact with the electrically insulating chamber 9.

In some embodiments, the electrically insulating chamber 9 may be entirely electrically insulating. That is, the electrically insulating chamber 9 exhibits a volume resistivity at 293 Kelvin, at 9 Volts and under the application of direct current, of at least $10^{13}$ Ohm·m. In some embodiments, the electrically insulating chamber 9 exhibits a volume resistivity at 293 Kelvin, at 9 Volts and under the application of direct current, of at least $10^{14}$ Ohm·m. In some embodiments, the electrically insulating chamber 9 exhibits a volume resistivity at 293 Kelvin, at 9 Volts and under the application of direct current, of at least $10^{16}$ Ohm·m.

In some embodiments, it is possible to determine a value of permittivity of the (dielectric and insulating) chamber 9 from a measurement of capacitance. That value of permittivity can then be used to differentiate between various fluids inside the electrically insulating chamber 9. In some embodiments, the medium is gaseous.

In some embodiments, the meandering pattern layer is made 4 from of a material having a temperature dependent resistance. In some embodiments, the meandering pattern layer 4 comprises a film 6 made from a material having a temperature dependent resistance. In some embodiments, the film 6 comprises a plurality of parallel or substantially parallel grooves 5.

In some embodiments, the film 6 comprises a minimum of two, a minimum of two three, and/or a minimum of five, or even ten, fifteen, thirty or fourty-five grooves. The grooves may be electrically insulating with a surface resistivity of at least 100 kOhm, at least 1 MOhm, and/or at least 10 MOhm. These resistivity values assume a temperature of 293 Kelvin, an applied voltage of 9 Volts and application of direct current.

In some embodiments, the measurement electrode 7 is in contact with the electrically insulating chamber 9. In some embodiments, the measurement electrode 7 is in direct contact with the electrically insulating chamber 9. In some embodiments, the electrically insulating chamber 9 is filled with a gaseous fluid selected from:

air, or
carbon dioxide, or
helium, or
nitrogen, or
sulfur hexafluoride.

In some embodiments, the electrically insulating chamber 9 is interposed between the measurement electrode 7 and the counter electrode 8. In some embodiments, at least one of the measurement electrode 7 or of the counter electrode 8 consists of a meandering pattern layer 4. In some embodiments, the measurement diaphragm 2 separates the electrically insulating chamber 9 from the medium. In some embodiments, the meandering pattern layer 4 comprises a first conductor 12a with a plurality of segments and a second conductor 12b with a plurality of segments, wherein the segments of the first conductor 12a mesh with the segments of the second conductor 12b.

The segments of the first conductor 12a may be different from the segments of the second conductor 12b. In some embodiments, the first conductor 12a is electrically insulated from second conductor 12b. In some embodiments, an electrically insulating layer is interposed between the first conductor 12a and the second conductor 12b.

In some embodiments, at least one of the first conductor 12a or second conductor 12b exhibits a serrated profile. In some embodiments, the first conductor 12a and the second conductor 12b each exhibit a serrated profile.

In some embodiments, the meandering pattern layer 4 comprises a pair of conductors, the pair of conductors being arranged as a bifilar meander.

In some embodiments, the film 6 comprises electrically conductive segments and electrically insulating segments 5, wherein the electrically conductive segments and the electrically insulating segments 5 are arranged in a pattern with alternating electrically conductive and electrically insulating segments. In some embodiments, the film 6 comprises at least five, at least ten or even fifteen electrically conductive segments. In some embodiments, the film 6 comprises at least five, at least ten or even fifteen electrically insulating segments 5. In some embodiments, the segments are strips.

In some embodiments, an (each) insulating segment has a first edge and a second edge opposite the first side. An electrically conductive segment is in contact with the first edge of said electrically insulating segment. Another electrically conductive segment is in contact with the second edge of said electrically insulating segment. In some embodiments, the meandering pattern layer 4 comprises a first electric connection member 11a and a second electric connection member 11b.

In some embodiments, the film 6 is made from an electrically conductive material and wherein the first electric connection member 11a and the second electric connection member 11b electrically connect to the film 6 such that an electric current may flow from the first electric connection member 11a through the film 6 to the second electric connection member 11b.

In some embodiments, the electric resistivity between the first electric connection member 11a and the second electric connection member 11b at 293 Kelvin, at 9 Volts and under the application of direct current lies between 5.0 Ohm and 10 kOhm, and/or between 5.0 Ohm and 1 kOhm. In some embodiments, the instant disclosure teaches an apparatus with at least one capacitive pressure transducer 1 or with at least one pressure transmitter according to the instant disclosure.

In some embodiments, there is an apparatus with at least one fuel cell and with at least one capacitive pressure transducer 1 or with at least one pressure transmitter according to the instant disclosure, wherein the at least one capacitive pressure transducer is configured to generate a signal indicative of pressure of a fluid such as gaseous fuel.

In some embodiments, there is an apparatus with at least one capacitive pressure transducer 1 or with at least one pressure transmitter according to the instant disclosure.

In some embodiments, there is an apparatus with at least one cogeneration plant and with at least one capacitive pressure transducer 1 according to the instant disclosure, wherein the at least one capacitive pressure transducer 1 is configured to generate a signal indicative of pressure of a fluid such as gaseous fuel.

In some embodiments, a capacitive pressure transducer 1 as disclosed herein is employed to measure differential pressure of a fluid, in particular of a (combustible) gas and/or of air. This particular type of capacitive pressure transducer 1 may, by way of non-limiting example, be arranged in a (side channel of) a Venturi tube and/or in a Venturi burner. The capacitive pressure transducer 1 is employed to regulate and/or (PID) control parameters of the burner such as the speed of a blower and/or gas/air ratios and/or valve positions.

In some embodiments, the meandering pattern layer 4 may be a meandering pattern portion 4 of an electrode 7, 8. The meandering pattern layer 4 may also be a meandering pattern conductor or a meandering pattern member.

Parts of the capacitive pressure transducer 1 or parts of a pressure measurement or manufacturing method according to the present disclosure may be embodied in hardware, in a software module executed by a processor, or by a cloud computer, or by a combination thereof. The software may include a firmware, a hardware driver run in the operating system, or an application program. Thus, the disclosure also relates to a computer program product for performing the operations presented herein. If implemented in software, the functions described may be stored as one or more instructions on a computer-readable medium. Some examples of storage media that may be used include random access memory (RAM), magnetic RAM, read only memory (ROM), flash memory, EPROM memory, EEPROM memory, registers, a hard disk, a removable disk, other optical disks, a Millipede® device, or any available media that can be accessed by a computer or any other IT equipment or appliance.

It should be understood that the foregoing relates only to certain embodiments of the disclosure and that numerous changes may be made therein without departing the scope of the disclosure as defined by the following claims. It should also be understood that the disclosure is not restricted to the illustrated embodiments and that various modifications can be made within the scope of the following claims.

REFERENCE NUMERALS 1 capacitive pressure transducer
2 measurement diaphragm
3 base body
4 meandering pattern layer
5 grooves
6 film
7 measurement electrode
8 counter electrode
9 chamber
10a, 10b spacers
11a-11f electric connection members
12a, 12b meandering conductors

The invention claimed is:

1. A capacitive pressure transducer for measuring the pressure of a medium adjacent to the transducer, the capacitive pressure transducer comprising:
a measurement diaphragm including a first surface and a second surface, wherein the first surface is in contact with the medium and the second surface faces away from the medium;
a measurement electrode integrated with the measurement diaphragm;
a base body arranged opposite the second surface, the base body comprising a counter electrode forming a measurement capacitance with the measurement electrode;
an electrically insulating chamber bounded by the base body and the measurement diaphragm;
wherein the counter electrode is in contact with the electrically insulating chamber;
at least one of the measurement electrode or the counter electrode comprises a meandering pattern layer in direct contact with the electrically insulating chamber.

2. The capacitive pressure transducer according to claim 1, wherein the meandering pattern layer comprising a material having a temperature dependent resistance.

3. The capacitive pressure transducer according to claim 1, wherein the meandering pattern layer comprises a film comprising a material having a temperature dependent resistance.

4. The capacitive pressure transducer according to claim 3, wherein the film comprises a plurality of substantially parallel grooves.

5. The capacitive pressure transducer according to claim 1, wherein the measurement electrode is in contact with the electrically insulating chamber.

6. The capacitive pressure transducer according to claim 1, wherein the electrically insulating chamber is filled with a fluid comprising a gas selected from the group consisting of: air, carbon dioxide, helium, nitrogen, and sulfur hexafluoride.

7. The capacitive pressure transducer according to claim 1, wherein the electrically insulating chamber is disposed between the measurement electrode and the counter electrode.

8. The capacitive pressure transducer according to claim 1, wherein at least one of the measurement electrode or of the counter electrode comprises a meandering pattern layer.

9. The capacitive pressure transducer according to claim 1, wherein the measurement diaphragm separates the electrically insulating chamber from the medium.

10. The capacitive pressure transducer according to claim 1, wherein:
the meandering pattern layer comprises a first conductor with a plurality of segments and a second conductor with a plurality of segments; and
the segments of the first conductor mesh with the segments of the second conductor.

11. The capacitive pressure transducer according to claim 3, wherein:
the film comprises electrically conductive segments and electrically insulating segments; and
the electrically conductive segments and the electrically insulating segments are arranged in a pattern with alternating electrically conductive and electrically insulating segments.

12. The capacitive pressure transducer according to claim 3, wherein the meandering pattern layer comprises a first electric connection member and a second electric connection member.

13. The capacitive pressure transducer according to claim 12, wherein:
the film comprises an electrically conductive material; and
the first electric connection member and the second electric connection member electrically connect to the film such that an electric current may flow from the first electric connection member through the film to the second electric connection member.

14. The capacitive pressure transducer according to claim 12, wherein the electric resistivity between the first electric connection member and the second electric connection member at 293 Kelvin, at 9 Volts, and under the application of direct current, lies between 5.0 Ohm and 10 kOhm.

15. The capacitive pressure transducer according to claim 1, wherein the meandering pattern layer comprises a pair of conductors arranged as a bifilar meander.

* * * * *